Oct. 31, 1961 A. S. COOPER 3,006,572

BELT WRAPPER FOR MAGNETIC CORES

Original Filed Sept. 20, 1957 3 Sheets-Sheet 1

Alfred S. Cooper,
Inventor.
Koenig and Pope,
Attorneys.

Alfred S. Cooper,
Inventor.
Koenig and Pope,
Attorneys.

Alfred S. Cooper,
Inventor.
Koenig and Pope,
attorneys.

United States Patent Office 3,006,572
Patented Oct. 31, 1961

3,006,572

BELT WRAPPER FOR MAGNETIC CORES

Alfred S. Cooper, Toronto, Ontario, Canada, assignor to Moloney Electric Company, St. Louis, Mo., a corporation of Delaware Original application Sept. 20, 1957, Ser. No. 685,170. Divided and this application Jan. 8, 1959, Ser. No. 785,688
4 Claims. (Cl. 242—78.5)

This invention relates to the manufacture of magnetic cores and more particularly to apparatus for the manufacture of magnetic cores from magnetic strip material such as grain-oriented steel strip.

This application is a division of my copending U.S. application, Serial No. 685,170, filed September 20, 1957, for Manufacture of Magnetic Cores.

Among the several objects of the invention may be noted the provision of apparatus for economically manufacturing magnetic cores of the class described which may be quickly and easily assembled with preformed conductive windings; the provision of apparatus for manufacturing such cores which are relatively quiet and have relatively low losses; and the provision of apparatus for manufacturing cores of the concentric wound offset but joint type. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a top plan view of a magnetic core-making apparatus of the present invention;

Corresponding reference characters indicate corresponding parts throughout the several views of the drawings.

Figure 3:
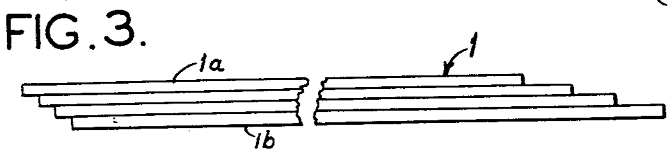
FIGS. 3–5 are elevations of three different packets of strip segments as they appear before being fed into the apparatus of the present invention.
Figure 4:
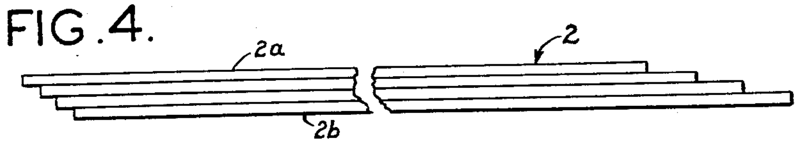
Figure 5:
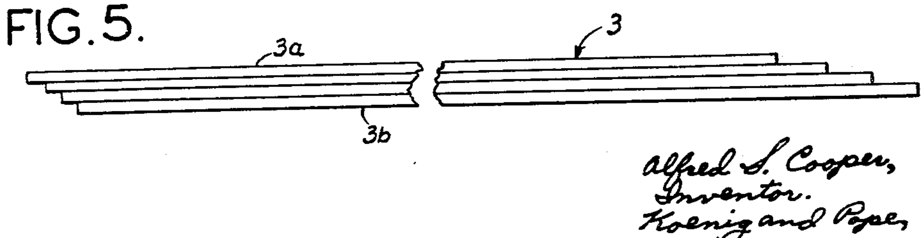

In making a core in accordance with this invention, a plurality of stacks or packets of segments of magnetic strip material such as are indicated at 1, 2 and 3 in FIGS. 3, 4 and 5 are first formed. Each of the stacks or packets consists of a plurality of strip segments with successive strip segments increasing in length by the factor $2\pi T$ where T is the strip thickness. The first strip segment *1a* of stack 1 has a length corresponding to the circumference of the inside of the core to be formed. The first strip segment *2a* of stack 2 differs in length from the last strip segment *1b* of stack 1 by the factor $2\pi T$. Similarly, the first strip segment *3a* of stack 3 differs in length from the last strip segment *2b* of stack 2 by the factor $2\pi T$. In each packet, the strips are shown as displaced lengthwise so that the ends of the segments are oppositely stepped at opposite ends of the packet.

Figures 6, 7:
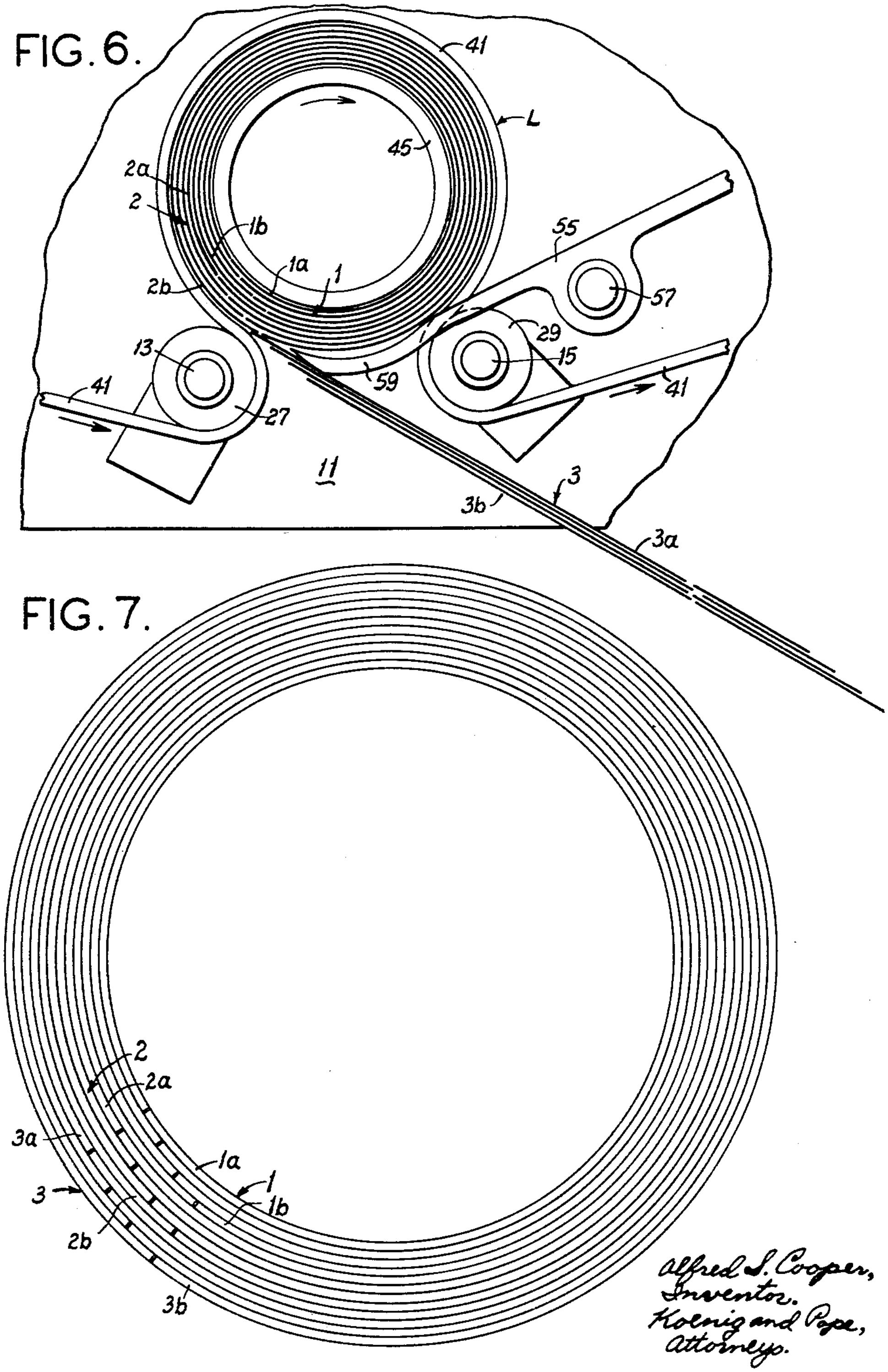
FIG. 6 is a top plan view of a portion of the apparatus of FIG. 1 on an enlarged scale illustrating a core-making method of the present invention.
FIG. 7 is a side view of a magnetic core made by the apparatus of the present invention.

The packets 1, 2 and 3 are formed into a core by coiling them one after another into ring form with each strip segment extending a full turn around the ring and with the ends of each strip segment forming a flux-transmitting joint, e.g., in butt joint contact, as illustrated in FIG. 7. This coiling may be carried out by means of apparatus of this invention of the type illustrated in FIGS. 1 and 2. As shown therein, the apparatus comprises a support constituted by a horizontal table or plate 11. Extending upward from this plate on one side of the plate are shafts 13, 15, 17, 19, 21, 23 and 25 on which there are pulleys 27, 29, 31, 33, 35, 37 and 39 for an endless belt 41. The pulleys and belt are relatively narrow in relation to the strip material which is to be made into cores, and are spaced upward from the plate 11. The pulley 35 is a drive pulley, its shaft 21 being adapted to be positively driven in counterclockwise direction as viewed in FIG. 1 by any suitable drive means (not shown). The pulleys bound a winding space 43 in which is located a cylindrical winding form 45, the axial dimension (width) of which is determined by the width of the strip material. The endless belt 41 leads to the left from drive pulley 35 to pulleys 37 and 39, around pulley 27, thence in a loop L around the winding form 45 to pulleys 29, 31 and 33, and to a belt-tensioning pulley 47, and then around the drive pulley 35. The belt-tensioning pulley 47 is carried by a clevis 49 at the end of a piston rod 51 which extends from a horizontal air cylinder 53. A lever 55 is pivoted intermediate its ends on a pin 57 extending upwardly from the surface of table 11. The lever comprises two parallel arms, the left ends of which lie on opposite sides of the belt and form an arcuate shoe 59 lying in the throat of the loop L formed by the pulleys 27 and 29, and extending between these pulleys. The other ends of the lever arms are strapped together as indicated at 61. Shoe 59 is biased against the surface of form 45 by an air cylinder 63, a piston rod 65 of which bears against the strapped end of lever 55.

Figures 1, 2:
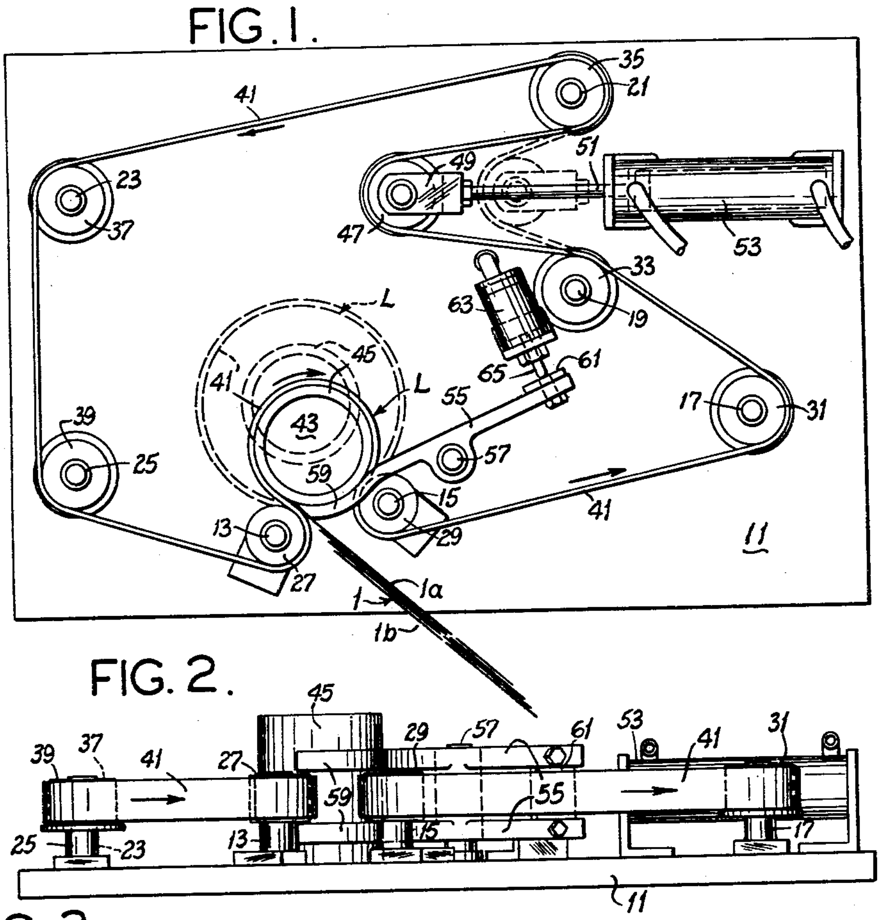
FIG. 2 is an elevation of the apparatus of FIG. 1.

In making a core in accordance with this invention utilizing the apparatus shown in FIGS. 1 and 2, the belt 41 is continuously driven by the drive pulley 35 in the direction indicated by the arrows in FIGS. 1, 2 and 6, and the packets 1, 2 and 3 are fed successively one after the other into the gap between pulley 27 and the outer end of shoe 59. The first packet is constrained by belt 41 to coil around form 45 and its leading end is directed by the shoe so that the ends of the strip segments come into a flux-transmitting butt-joint contact. When the first packet has been thus coiled into ring form, the second packet is fed in, and it coils up into ring form around the first packet with the ends of the strip segments in butt-joint contact. When the second packet has been thus coiled into ring form, the third packet is fed in, and it coils up into ring form around the second packet with the ends of the strip segments in butt-joint contact. As each packet is fed in, the air cylinder 53 allows for yielding of the tensioning pulley 47 to permit the necessary expansion of the loop of the belt around the winding form while maintaining the belt taut. As the build of the core being formed increases, the belt 41, core form 45 and tensioning pulley 47 move to positions as indicated by the dashed line of FIG. 1. The core formed by the three packets of segments is shown in more detail in FIG. 7.

While the coiling of three packets is described above, it will be understood that this is only by way of example and ordinarily there will be more than three packets that will be coiled one after another into ring form.

According to another method of making a core in accordance with this invention, a plurality of packets of magnetic strip material such as indicated at 1, 2 and 3 in FIGS. 3–5 are again utilized. However in this instance instead of first coiling packet 1 around a core form and thereafter coiling packets 2 and 3 therearound, packet 3 is first coiled into the form of a ring, with each strip segment extending a full turn around the ring and with the two ends of each segment in butt joint relation, as illustrated in FIG. 7. Then, packet 2 is coiled into the form of a ring on the inside of packet 3. Then packet 1 is coiled into the form of a ring on the inside of packet 2. This type of coiling may be carried out by means of apparatus of this invention of the type illustrated in FIGS. 8 and 9. As shown therein, this apparatus comprises a relatively long and narrow rectangular table 71. At one end of the table there are vertical side members 105 which support a horizontal cantilever bracket plate 107. This plate 107 is located above the table and projects out beyond the end of the table. Extending down from the plate 107 is a vertical shaft 109 on which is fixed a cylindrical arbor 111 which serves as a winding form. At the other end of table 71 is a lever 73 pivoted on a pin 75 extending upwardly from table 71. A pulley 77 is keyed to a shaft 79 projecting upwardly from one end of lever 73 and rotatable therein. Connected to the other end of lever 73 by a piston rod 81 is a pneumatic cylinder 83, which when actuated controls the positioning of shaft 79 in an arcuate slot 85 of table 71. An endless belt 87 is trained around the pulley 77 and the arbor 11, passing between the side members 105 and under the plate 107.

A pair of guides or idler pulleys 89 and 91 is mounted on shafts 93 and 95 which project downwardly from plate 107. These pulleys confine or restrict the belt 87 immediately adjacent winding form 111, thereby establishing a throat for the loop L′ of the belt around form 111. A forming shoe of arcuate shape, indicated at reference numeral 97, is positioned between pulleys 89 and 91. A vertical guide plate 99 for the packets of segments is affixed to table 71.

A core form 101 is located below and coaxial with winding form 111. Form 101 is constituted by a split metal ring having a width somewhat narrower than the core to be formed. The inner periphery of form 101 corresponds to the outer periphery of the core to be formed and may be varied by tightening or loosening a bolt 103. Form 101 rests on a table 117 carried by a rod 119. This rod is rotatable and axially movable in a base 121.

Figure 8:
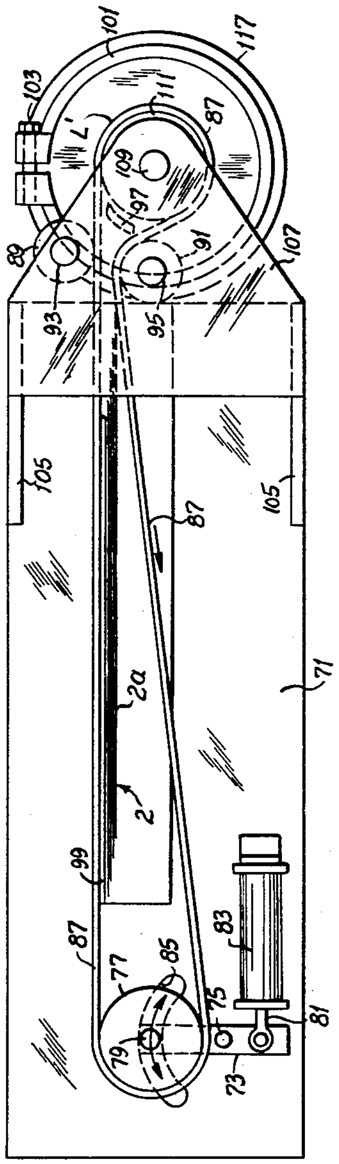
FIG. 8 is a top plan view of a second embodiment of the apparatus of the present invention.
Figure 9:
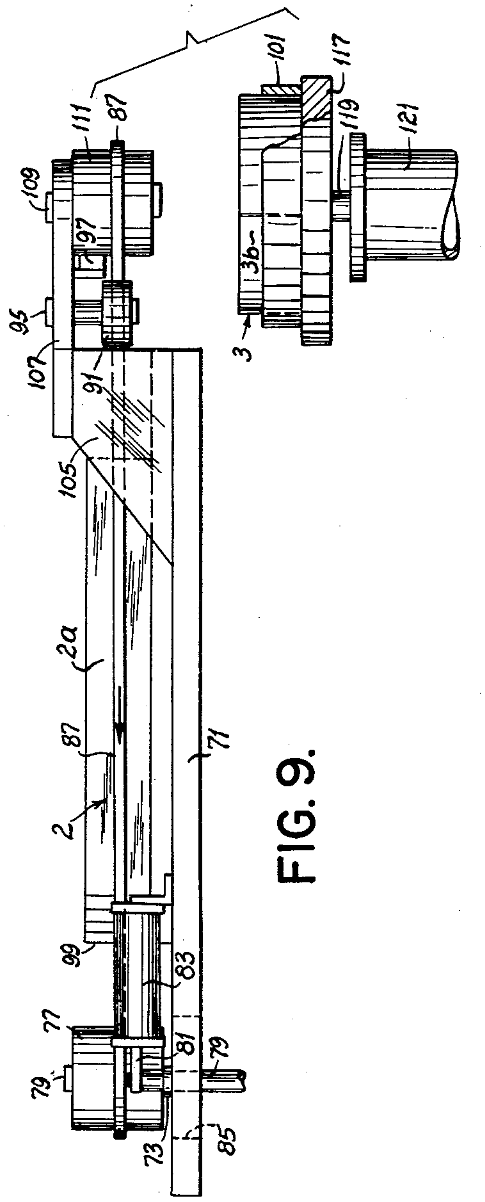
FIG. 9 is an elevation of the apparatus of FIG. 8.

The forming of a wound core by the apparatus of FIGS. 8 and 9 is accomplished by feeding in a packet of strip segments, aligned by the guide plate or bar 99, into the throat of the loop L′. A packet is formed into a ring around form 111 by driving belt 87 in a clockwise direction as indicated and tensioning it by actuation of cylinder 83 to move pulley 77. Belt 87 can be driven by powering shaft 79 from a conventional belt and pulley system, or manually. Any tendency for the leading edges of the strip segments in the packet to spring out is overcome by the belt tension and by the shoe 97. After the first packet is coiled around arbor 111 (which has a diameter equal or less than the inner diameter of the core being formed), table 117 is moved toward form 111 until the opposing edge of the latter is in contact with the surface of table 117. The tension of belt 87 is then released by deactuation of air cylinder 83 and coiled packet 3 springs open inside the surrounding core form 101. As the inside diameter of form 101 corresponds to the length of segment 3*b* and each of the other segments in packet 3 is shorter by the factor $2\pi T$ than the preceding segment, the ends of each of the segments are brought into substantial butt-joint contact. This operation is repeated with packet 2 which is thereby positioned inside of packet 3 with segment 2*b* being adjacent segment 3*a*. Thus a wound core as shown in FIG. 7 is formed.

It is preferred that the butt joint of the outer segment of each packet be angularly displaced from the butt joint of the inner segment of the packet surrounding it. This displacement is preferably of such magnitude that the spacing between such adjacent segment butt joints will be equal to $2\pi NT$ where N equals number of segments from the inner circumference of the core. That is, the butt joints of segments 3*b*, 2*b* and 1*b* are each aligned on a radius of the core formed. In some instances, however, it is desirable that these butt joints are not radially aligned, but are positioned on different radii of the core.

The cores thus formed are then banded by a steel strap or tack welded across the butt joint of segment 3*b* to permit them to be removed from the core form 45 or 101. If the conventional rectangular core is desired, the cores formed by this invention can be so formed by hydraulic jacks or presses, after which these rectangular cores are then annealed to remove the resulting mechanical stresses. The annealed cores are then dissembled packet by packet, and assembled in the same relative positions around preformed transformer windings, packet 1 being removed and reassembled around the windings first, followed by packets 2 and 3.

It is to be understood that the core forms used in the apparatus of the present invention are not limited to a circular shape, but may be of elliptical or other configurations.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for making magnetic cores from packets of segments of magnetic strip material comprising a table, a winding form supported on the table and extending upward therefrom, said winding form being rotatable on a vertical axis and being shiftable laterally on the table, a plurality of pulleys extending upward from the table, an endless belt trained around the pulleys and the winding form, one of said pulleys being a drive pulley, said belt extending from a first of said pulleys in a loop around the winding form and thence around a second of said pulleys, said first and second pulleys being spaced apart a distance such as to define a throat therebetween narrower than the diameter of the winding form for insertion therethrough of packets to be wound on said winding form, a shoe movably mounted in said throat, and means for biasing said shoe into engagement with the winding form and packets being wound thereon.

2. Apparatus for making magnetic cores from packets of segments of magnetic strip material comprising a table, a winding form supported on the table and extending upward therefrom, said winding form being rotatable on a vertical axis and being shiftable laterally on the table, a plurality of pulleys extending upward from the table, an endless belt trained around the pulleys and the winding form, the width of the belt being less than the height of the winding form, one of said pulleys being a drive pulley, said pulleys bounding a winding space in which the winding form is located, said belt leading inward to said winding space around a first of said pulleys, thence in a loop around the winding form and thence outward and around a second of said pulleys, said first and second pulleys being spaced apart a distance such as to define a throat therebetween narrower than the diameter of the winding form for insertion therethrough of packets to be wound on said winding form, a lever pivoted for swinging movement on top of the table on a vertical axis lying within the confines of the endless belt, said lever having spaced upper and lower portions straddling the belt and extending across said throat from one side of the throat toward the other and terminating short of the other side of the throat to provide a space for insertion of packets to be wound on said winding form, and means for biasing said lever to swing in the direction for engagement of said portions of the lever with the winding form and with packets being wound on said winding form.

3. Apparatus for making magnetic cores as set forth in claim 2 wherein one of said pulleys is a belt-tensioning idler pulley movable laterally over the table, and wherein means is provided for biasing said idler pulley to tension said belt to hold it taut around the winding form and packets wound thereon and which permits said loop to expand around the winding form as packets are wound thereon.

4. Apparatus for making magnetic cores as set forth in claim 3 wherein said upper and lower portions of said lever are formed to provide an arcuate shoe engageable with said winding form and with packets being wound on said winding form.

References Cited in the file of this patent

UNITED STATES PATENTS

| | | |
|---|---|---|
| 789,786 | Bellamy | May 16, 1905 |
| 941,331 | Mueller | Nov. 23, 1909 |
| 2,357,157 | Wood | Aug. 29, 1944 |
| 2,742,240 | Stephens et al. | Apr. 17, 1956 |